United States Patent [19]
Penrod

[11] Patent Number: 5,258,786
[45] Date of Patent: Nov. 2, 1993

[54] ATTACHABLE PIVOTAL VISOR

[76] Inventor: William A. Penrod, 25 Banbury La., Pittsburgh, Pa. 15202

[21] Appl. No.: 904,170

[22] Filed: Jun. 25, 1992

Related U.S. Application Data

[63] Continuation-in-part of Ser. No. 585,825, Sep. 19, 1990, abandoned.

[51] Int. Cl.⁵ .................................................. G02C 9/00
[52] U.S. Cl. .................................... 351/47; 351/44; 351/57
[58] Field of Search .................. 351/44, 47, 57, 59; 2/12, 13

[56] References Cited

U.S. PATENT DOCUMENTS

| | | | |
|---|---|---|---|
| 2,691,165 | 1/1953 | Kane | 2/13 |
| 2,714,717 | 6/1954 | Allman | 351/47 |
| 3,183,523 | 5/1962 | Harrison | 351/47 |
| 3,413,057 | 1/1963 | Carmichael | 351/47 |
| 5,005,214 | 11/1989 | Koethe | 351/47 |
| 5,100,224 | 3/1992 | Terrasi | 351/57 |

*Primary Examiner*—Bruce Y. Arnold
*Assistant Examiner*—Hung Xuan Dang

[57] ABSTRACT

A visor apparatus for attachment to a pair of eyeglasses; the apparatus has two main parts, including a clip means which attaches to a pair of eyeglasses and a visor portion which is pivotally attached to the clip means. Preferably the visor portion and the clip means are manufactured from light weight and durable plastic. When the visor apparatus is attached to a pair of eyeglasses the visor portion may be locked into a functional position or a position which is substantially perpendicular to the wearer's forehead and an inoperative position or a position which is substantially parallel to the wearer's forehead.

3 Claims, 2 Drawing Sheets

ATTACHABLE PIVOTAL VISOR

The present application is a continuation in part of U.S. patent application Ser. No. 07/585,825, entitled Attachable Pivotal visor, filed on Sep. 19, 1990, now abandoned.

FIELD OF THE INVENTION

The present invention relates generally to a visor apparatus and more particularly to a pivotal visor apparatus for attachment to eyeglasses.

BACKGROUND OF THE INVENTION

Heretofore, a number of devices have been proposed for attaching a visor to eyeglasses. The following devices are illustrative.

U.S. Pat. No. 4,446,571 issued on May 8, 1984 to Ross discloses a device wherein a visor is attached to the temples of a pair of eyeglasses. The visor is concave so as to form around the forehead of the wearer and is attached by way of an elastic attachment means around the temples of the eyeglasses.

U.S. Pat. No. 4,543,667 issued on Oct. 1, 1985 to Garbutt also discloses a device wherein a visor is attached to the temples of a pair of eyeglasses. The visor is also attached by way of an elastic attachment means around the temples of the eyeglasses but the Garbutt device differs from Ross in that the elastic attachment means attaches to a ribbon which surrounds the visor. The Ross visor is attached to the elastic attachment means by way of holes and pins through the body of the visor.

The above cited devices, however, have various disadvantages which have prevented them from widespread use. For example, these devices require that removal of the visor be accomplished by removal of the eyeglasses to which they are attached. This may be highly undesirable if the user requires eyeglasses for corrected vision. Secondly, removal of the visor from the eyeglasses is difficult as the elastic means must be stretched over the entire length of the temple portion of the eyeglasses.

A related device to the attachable visor is the well known attachable sunshades. Attachable sunshades come in a variety of designs from flip sunshades to clip-on sunshades. However, sunshades do not provide protection from the sun for the entire face.

The present invention effectively overcomes these various disadvantages of the known devices, and at the same time provides a visor attachment for eyeglasses which is simplified in construction, only comprises two main parts, and may be easily and conveniently used.

SUMMARY OF THE INVENTION

The present invention provides a visor apparatus for attachment to the glasses portion of a pair of eyeglasses, the apparatus includes a main visor portion and a clip means that is capable of moving the visor portion from one position to another. The clip means is formed so as to be removable from the glasses portion of a pair of eyeglasses and includes a means of permanent attachment to the main visor portion that pivotally supports the main visor portion in an functional position and inoperative position. The functional position is the position where the main visor portion would be extended approximately ninety degrees to the eyeglasses. The inoperative position is the position where the main visor portion is extended upward over the eyeglasses in a parallel position to the face of the wearer.

In the preferred embodiment, the visor apparatus according to the present invention includes two main component parts, a clip means and a visor portion, with the clip means being integrally molded in unitary construction with the visor portion. The clip means includes a plurality of fingers adapted to frictionally engage and securely retain the visor apparatus to the glasses portion of a pair of eyeglasses in either a functional or inoperative position. The invention thus eliminates any need for auxiliary positioning means, while ensuring that the visor portion will be properly retained in the desired position. The visor portion, preferably, is of a shape which shades the entire face including the nose, cheeks, temples, lips and chin. The visor length is longer than the height of the eyeglasses and extends beyond the eyeglasses so that shading may be obtained on the entire face including, but not limited to the nose, cheeks, temples, lips and chin.

The clip means is conveniently attachable to the glasses portion of a pair of eyeglasses merely by clipping two pairs of fingers of the clip means onto the glasses portion of a pair of eyeglasses, thus avoiding any undesirable modification of the eyeglasses themselves.

DETAILED DESCRIPTION OF THE INVENTION

Figure 1A:
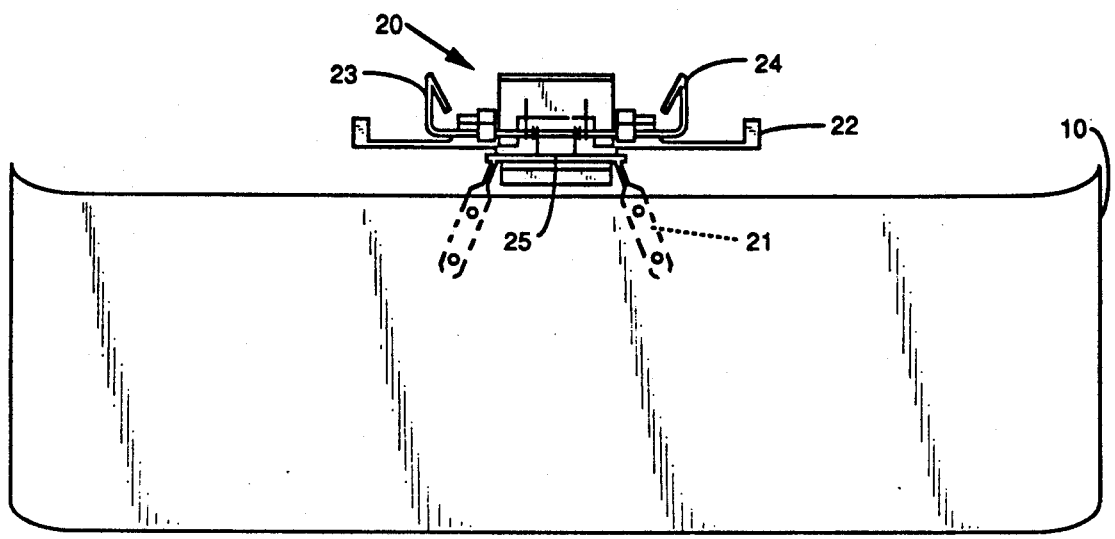
FIG. 1a is a top perspective view of the visor apparatus according to the present invention in the functional position.
Figure 1B:
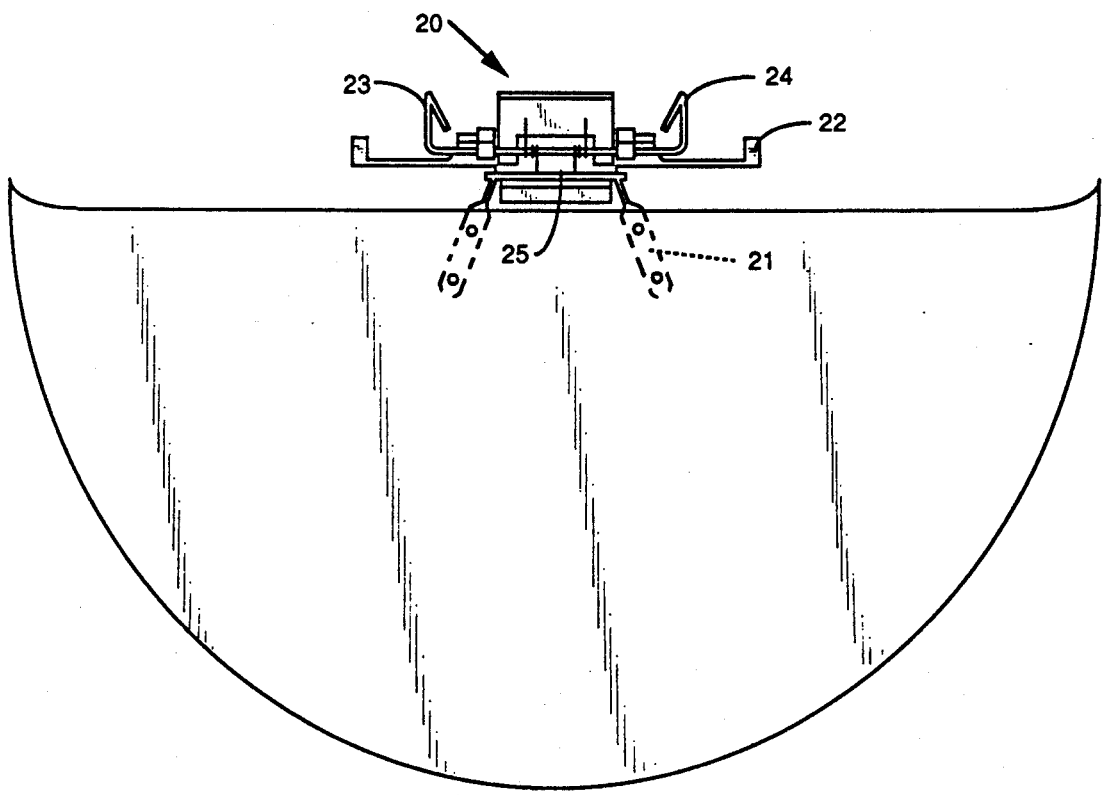
FIG. 1b is a top perspective view of the visor apparatus according to another embodiment of the present invention.

FIG. 1a is top perspective view of the visor apparatus according to the present invention. With reference to FIG. 1a, the visor portion 10 of the apparatus is integrally molded in unitary construction from a substantially non-transparent material, such as a lightweight dark colored plastic. It will be understood that such material may be colored as desired so as to provide a light screening effect, in which case the visor portion will serve as a screen from the sun or bright light for the entire face. The unitary visor portion 10 may be formed such that there is a concave front portion and a linear back portion (or semicircular), as shown in FIG. 1b, or in rectangular dimension as shown. The visor portion may be of any shape but, the visor should provide shading for the entire face including temples, the nose, cheeks and chin. In this respect, it is preferred that the visor portion extend laterally past the width of the eyeglasses and extends forward in the operative position for a length greater than the height of the eyeglasses to ensure that proper shading is provided to the entire face at most anytime of the day. The visor may be attached to a clip means 20 by way of a sealant, pins, and/or screws to the linear back portion of the visor.

Figure 3:
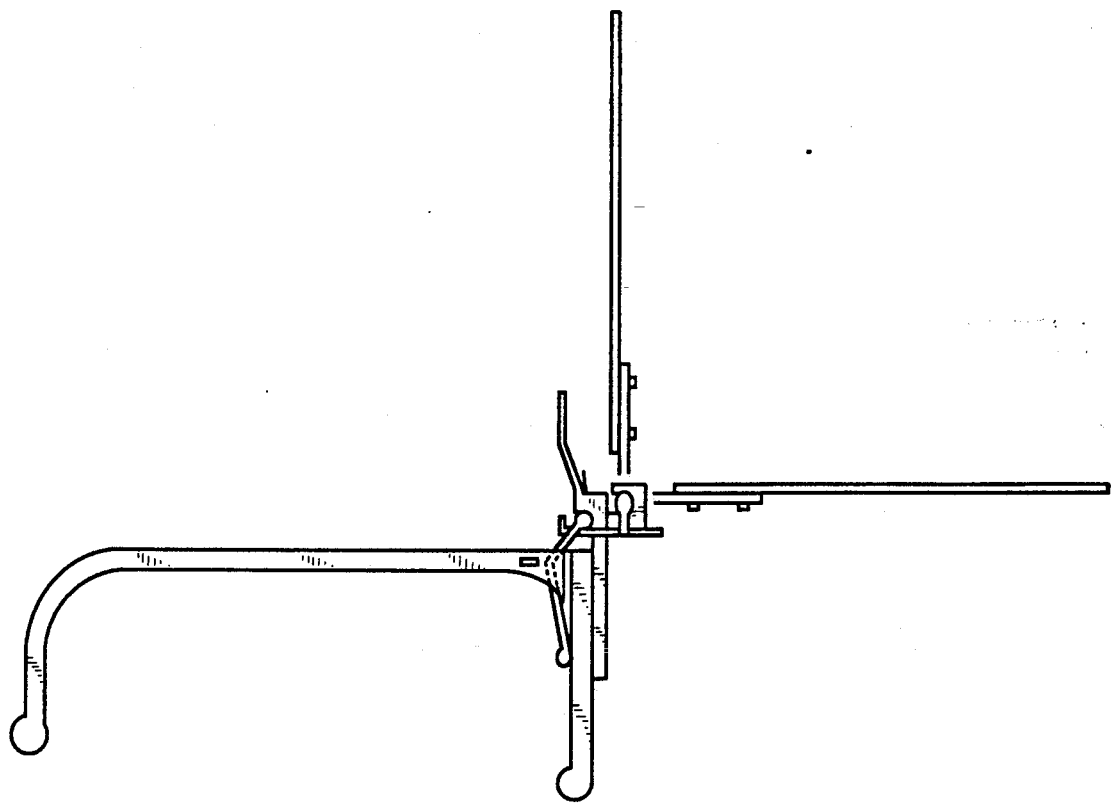
FIG. 3 is a side perspective view of the visor apparatus according to the present invention attached to a pair of conventional eyeglasses.

The clip means 20 is integrally formed or molded and may be comprised of a U-shaped portion 21 which attaches to the visor portion 10 of the apparatus as described above, a central pivotal portion 22, and at least two pairs of fingers 23 and 24 which are formed to act like clamps. The pairs of fingers 23 and 24 are disposed evenly on the respective sides of the central pivotal portion 22 and extend in an oppositely facing relation thereto. Of course, the U-shaped portion 21 may be any means which can attach the visor portion 10 with the central pivotal portion 21. The clip means 20 may be integrally molded or formed from a suitable material, such as a durable plastic. The entire clip means 20, including the pairs of fingers, is adapted to extend transversely across the top of the glasses portion of a pair of eyeglasses when attached thereto. As shown in FIG. 3, the pairs of fingers 23 and 24 engage the top of the eyeglasses by fitting over the glasses frame one finger in the back and one in the front. Thus, pairs of fingers 23 and 24 clamp onto the glasses conveniently and easily.

Figure 2A:
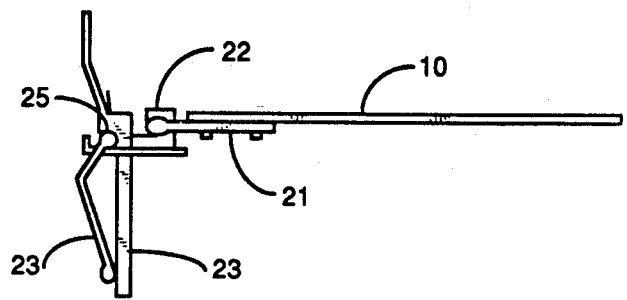
FIG. 2a is a side perspective view of the visor apparatus according to the present invention in the functional position.
Figure 2B:
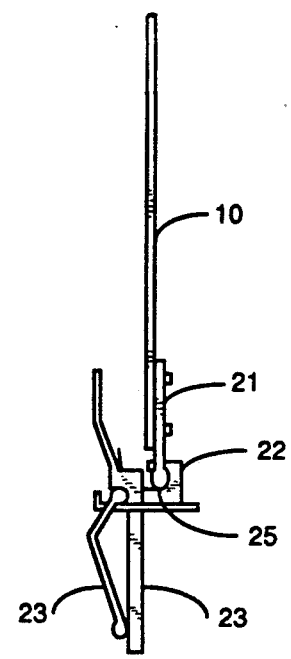
FIG. 2b is a side perspective view of the visor apparatus according the present invention in the inoperative position.

The U-shaped portion 21 of the clip means 20 is connected to the central pivotal portion 22 by way of a hinge 25 which has a means to lock the visor portion into a functional or inoperative position. As show in FIG. 2a, the functional position being the position where the visor is perpendicular to the wearer's forehead and as shown in FIG. 2b, the inoperative position being the position where visor is pushed upward parallel to the wearer's forehead.

From the foregoing description it will be understood that the present invention provides a visor apparatus which can be readily clipped onto the glasses portion of a pair of eyeglasses. When in the clipped position on a pair of eyeglasses, the visor can be readily flipped through a ninety degree angle between the functional and the inoperative positions, which is convenient when the visor is not desired. The two piece construction of the invention permits ease of attachment and detachment from the eyeglasses. The locking means of the clip means eliminates any need for auxiliary means for retaining the visor in the functional position, while permitting pivotal movement between the functional and inoperative positions.

Although the above description has included only one embodiment of the present invention, it will be understood that the invention may be embodied in other specific forms without departing from the spirit or essential characteristics thereof. The present embodiment is therefore to be considered in all respects as illustrative, and not restrictive. The scope of the present invention is indicated by the appended claims rather than by the foregoing description.

What is claimed is:

1. A visor apparatus, comprising:
a non-transparent visor portion attached to a clip means such that the visor portion can be selectively moved in an operative position substantially perpendicular to a wearer's forehead and an inoperative position substantially parallel to the wearer's forehead, the visor portion being of a rectangular dimension which extends past the width of a pair of eyeglasses and which extends forward in the operative position at a length greater than the height of the eyeglasses and being large enough in shape such that, when the visor is in the operative position, the wearer's face is entirely shaded;
a clip means adapted to be attachable to a pair of eyeglasses, said clip means including at least two pairs of elongated members that extend over the glasses portion of a pair of eyeglasses and thereby mounting on the pair of eyeglasses; a central pivotal portion integrally attached to the pairs of elongated members; attaching means to attach said central pivotal portion with said visor portion; and a hinge that attaches said central pivotal portion to said attaching means, said hinge including a locking means for positioning said visor portion in the operative and inoperative positions.

2. A visor apparatus, comprising:
a non-transparent visor portion attached to a clip means such that the visor portion can be selectively moved in an operative position substantially perpendicular to a wearer's forehead and an inoperative position substantially parallel to the wearer's forehead, the visor portion being of a semicircular dimension which extends past the width of a pair of eyeglasses and which extends forward in the operative position at a length greater than the height of the eyeglasses and being large enough in shape such that when the visor is in the operative position, the wearer's face is entirely shaded;
a clip means adapted to be attachable to a pair of eyeglasses, said clip means including at least two pairs of elongated members that extend over the glasses portion of a pair of eyeglasses and thereby mounting on the pair of eyeglasses; a central pivotal portion integrally attached to the pairs of elongated members; attaching means to attach said central pivotal portion with said visor portion; and a hinge that attaches said central pivotal portion to said attaching means, said hinge including a locking means for positioning said visor portion in the operative and inoperative positions.

3. A visor apparatus, comprising:
a non-transparent visor portion attached to a clip means such that the visor portion can be selectively moved in an operative position substantially perpendicular to a wearer's forehead and an inoperative position can be substantially parallel to the wearer's forehead, the visor portion being of a extends forward in the operative position at a length greater than the height of the eyeglasses and being large enough in shape such that when the visor is in the operative position, the wearer's face is entirely shaded including the eyes, nose, cheeks, temples, and chin;
a clip means adapted to be attachable to a pair of eyeglasses, said clip means including at least two pairs of elongated members that extend over the glasses portion of a pair of eyeglasses and thereby mounting on the pair of eyeglasses; a central pivotal portion integrally attached to the pairs of elongated members; attaching means to attach said central pivotal portion with said visor portion; and a hinge that attaches said central pivotal portion to said attaching means, said hinge including a locking means for positioning said visor portion in the operative and inoperative positions.

* * * * *